(12) United States Patent
Mabrouk et al.

(10) Patent No.: US 9,475,696 B2
(45) Date of Patent: Oct. 25, 2016

(54) METHODS FOR PRODUCING SYNTHESIS GAS FOR AMMONIA PRODUCTION

(71) Applicants: Rachid Mabrouk, Munich (DE); Ramachandran Krishnamurthy, Piscataway, NJ (US)

(72) Inventors: Rachid Mabrouk, Munich (DE); Ramachandran Krishnamurthy, Piscataway, NJ (US)

(73) Assignee: Linde Aktiengesellschaft, Munich (DE)

( * ) Notice: Subject to any disclaimer, the term of this patent is extended or adjusted under 35 U.S.C. 154(b) by 0 days.

(21) Appl. No.: 14/187,663

(22) Filed: Feb. 24, 2014

(65) Prior Publication Data

US 2015/0291437 A1 Oct. 15, 2015

(51) Int. Cl.
*C01B 3/48* (2006.01)
*C01C 1/04* (2006.01)
*C01B 3/02* (2006.01)
*C01B 3/44* (2006.01)

(52) U.S. Cl.
CPC .................. *C01B 3/48* (2013.01); *C01B 3/025* (2013.01); *C01B 3/44* (2013.01); *C01C 1/0405* (2013.01); *C01B 2203/0233* (2013.01); *C01B 2203/0288* (2013.01); *C01B 2203/043* (2013.01); *C01B 2203/068* (2013.01); *C01B 2203/1058* (2013.01); *C01B 2203/1241* (2013.01)

(58) Field of Classification Search
CPC combination set(s) only.
See application file for complete search history.

(56) References Cited

U.S. PATENT DOCUMENTS

| 6,942,719 B2 * | 9/2005 | Stewart | C01B 3/38 423/230 |
| 7,300,642 B1 * | 11/2007 | Pedersen | C01C 1/0488 252/373 |
| 2005/0279023 A1 | 12/2005 | Stewart et al. | |

OTHER PUBLICATIONS

Proll and Hofbauer, Chemical Looping Combustion and Reforming, Proceedings of the 9th European Conference on Industrial Furnaces and Boilers, Estoril Portugal 26-29 2011, 15pp.

* cited by examiner

*Primary Examiner* — Stanley Silverman
*Assistant Examiner* — Syed Iqbal
(74) *Attorney, Agent, or Firm* — Philip H. Von Neida

(57) ABSTRACT

A method for producing synthesis gas and ammonia by forming a synthesis gas mixture; separating solids from the synthesis gas mixture; subjecting the synthesis gas mixture to a shift reaction and separating the reaction products by a pressure swing adsorption unit. The hydrogen and nitrogen separated in the pressure swing adsorption unit are fed to an ammonia reactor to produce ammonia.

26 Claims, 1 Drawing Sheet

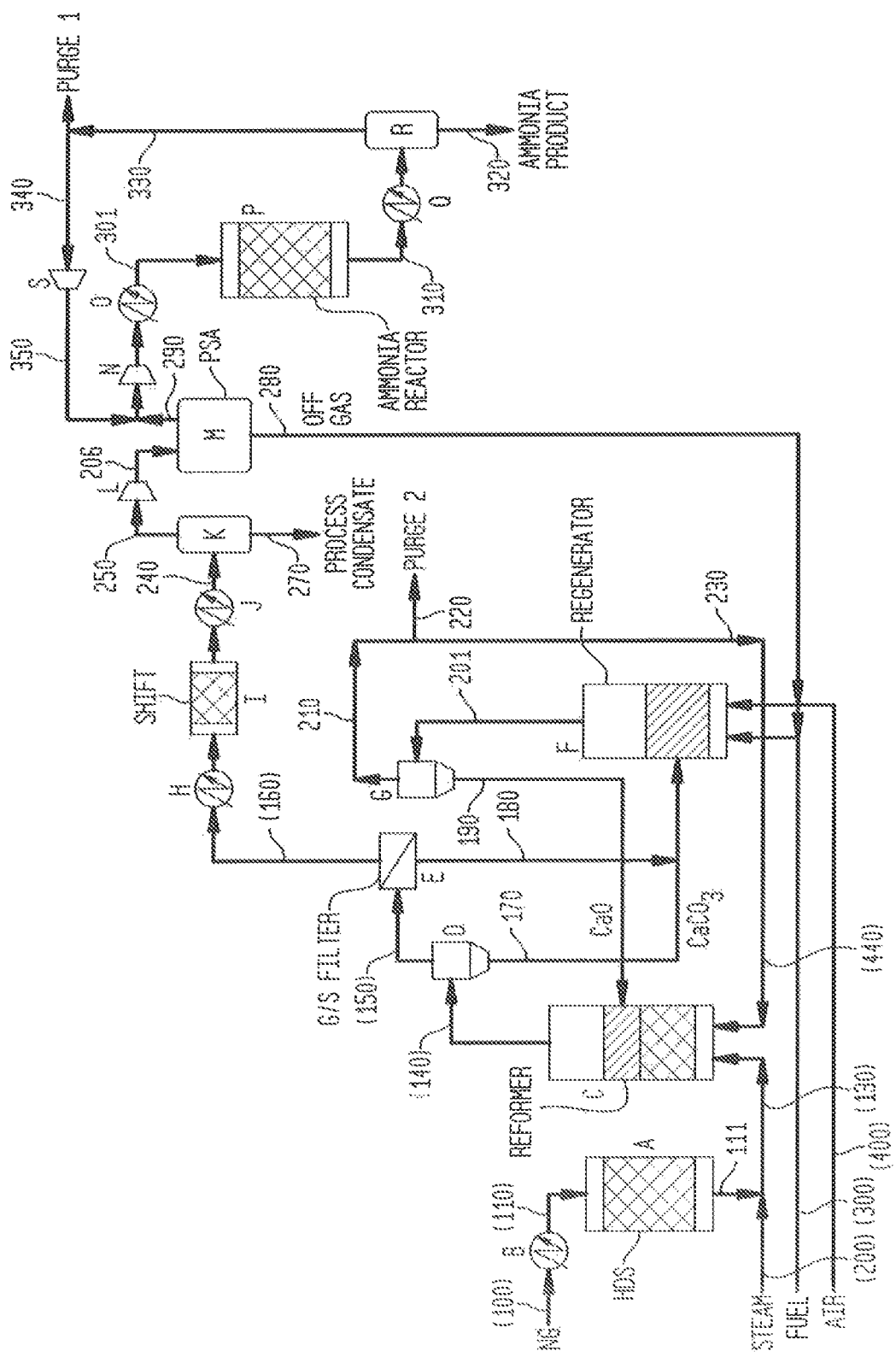

METHODS FOR PRODUCING SYNTHESIS GAS FOR AMMONIA PRODUCTION

BACKGROUND OF THE INVENTION

The conversion of hydrocarbons to hydrogen and carbon monoxide containing gases is well known in the art. Examples of such processes include catalytic steam reforming, auto-thermal catalytic reforming, catalytic partial oxidation and non-catalytic partial oxidation. Each of these processes has advantages and disadvantages and produces various ratios of hydrogen and carbon monoxide, also known together as synthesis gas.

Partial oxidation processes are also well known and the art is replete with various catalytic and non catalytic processes. Catalytic partial oxidation is an exothermic reaction wherein a hydrocarbon gas, such as methane, and an oxygen-containing gas, such as air, is contacted with a catalyst at elevated temperatures to produce a reaction product containing high concentrations of hydrogen and carbon monoxide. The catalysts used in these processes are typically noble metals, such as platinum or rhodium, and other transition metals, such as nickel on a suitable support.

Partial oxidation processes convert hydrocarbon-containing gases, such as natural gas, to hydrogen, carbon monoxide and other trace components such as carbon dioxide and water. The process is typically carried out by injecting preheated hydrocarbons and an oxygen-containing gas into a combustion chamber where oxidation of the hydrocarbons occurs with less than stoichiometric amounts of oxygen for complete combustion. This reaction is conducted at very high temperatures, such as in excess of 700° C. and often in excess of 1,000° C., and pressures up to 150 atmospheres. In some reactions, steam or carbon dioxide can also be injected into the combustion chamber to modify the synthesis gas product and to adjust the ratio of hydrogen to carbon monoxide.

More recently, partial oxidation processes have been disclosed in which the hydrocarbon gas is contacted with the oxygen-containing gas at high space velocities in the presence of a catalyst such as a metal deposited on a ceramic foam (monolith) support. The monolith supports are impregnated with a noble metal such as platinum, palladium or rhodium, or other transition metals such as nickel, cobalt, chromium and the like. Typically, these monolith supports are prepared from solid refractory or ceramic materials such as alumina, zirconia, magnesia and the like. During operation of these reactions, the hydrocarbon feed gases and oxygen-containing gases are initially contacted with the metal catalyst at temperatures in excess of 400° C., typically in excess of 600° C., and at a standard gas hourly space velocity (GHSV) of over 100,000 per hour.

The present invention utilizes chemical looping process layout to prepare a synthesis gas, mainly hydrogen and nitrogen at the right ration, for later conversion to ammonia.

Hydrogen and nitrogen are the two main ingredients used in ammonia synthesis. Hydrogen and nitrogen can be supplied, either separately, where nitrogen from an air separation unit is mixed with hydrogen from a hydrogen unit via hydrocarbon reforming such as steam methane reforming (SMR).

Hydrogen and nitrogen can be produced simultaneously using an air blown auto-thermal reformer for instance where there is no need for an air separation unit.

For small capacities, neither of these technologies are as effective for monetizing production processes using small to medium hydrocarbon feed stocks. Chemical looping where a desulfurized natural gas stream is reacted with steam and pressurized flue gas in a chemical looping reformer before undergoing an isothermal shift and then pressure swing adsorption separation. The resulting synthesis gas is fed to an ammonia synthesis unit where ammonia is produced.

The present invention uses the chemical looping reformer to produce a feedstock of a synthesis gas mixture which is subjected to a shift reaction and separation process to produces hydrogen and nitrogen molecules used in the ammonia production process.

SUMMARY OF THE INVENTION

In one embodiment of the invention, there is disclosed a method for producing synthesis gas for the production of ammonia comprising the steps:

a) Feeding a hydrocarbon and steam to a reformer;
b) Feeding the reaction products of the reformer to a separation unit whereby solids are separated from gases;
c) Feeding the solids to a regenerator and the gases to a shift reactor;
d) Recycling the flue gas stream to a reformer;
e) Feeding the products of the shift reactor to a pressure swing adsorption unit;
f) Feeding hydrogen and nitrogen separated from the gases to an ammonia reactor; and
g) Recovering ammonia from the ammonia reactor.

In a different embodiment of the invention, there is disclosed a method for producing ammonia comprising the steps:

a) Feeding a hydrocarbon and steam to a reformer;
b) Feeding the reaction products of the reformer to a separation unit whereby solids are separated from gases;
c) Feeding the solids to a regenerator and the gases to a shift reactor;
d) Recycling the flue gas stream to a reformer;
e) Feeding the products of the shift reactor to a pressure swing adsorption unit;
f) Feeding hydrogen and nitrogen separated from the gases to an ammonia reactor; and
g) Recovering ammonia from the ammonia reactor.

The hydrocarbon is typically natural gas but other hydrocarbons such as conventional and unconventional gases, Naphtha and liquid hydrocarbons may be employed. The hydrocarbon is typically fed to a hydrodesulfurization unit first to hydrogenate and desulfurize the natural gas before joining with the steam and being fed to the reformer.

The reformer is typically a fluidized bed reactor containing two solid type materials, namely a solid catalyst such as a nickel based catalyst and a calcium oxide powder. The reforming reaction occurs at temperatures in the range of 700° to 800° C., preferably 750° C.

The reaction products from the reformer comprise calcium carbonate, calcium oxide and synthesis gas. These reaction products are fed to a separator such as a cyclone which will separate the solids which are fed to a regenerator from the gases which are fed to a shift reactor.

The solids are fed to a regenerator where the calcium carbonate is calcined to form CaO and a fraction (20% to 60%) ideally 30% of the product waste gases. Carbon dioxide, steam and nitrogen are fed to the reformer for use in reforming the steam and the hydrocarbon feed. In case the reforming catalyst used is intolerant to oxygen, the calciner might be operated at oxygen lean mode to avoid excess air as unburned oxygen.

As noted above, an excess use of air as the oxidant can be deleterious to traditional catalyst materials. Rather than use this excess oxygen and change the catalyst materials to something more oxygen tolerant, a slightly less than stoichiometric amount of air (oxygen) can be employed. While this will result in more unburned fuel (methane and carbon monoxide), the reformer will be able to deal with this unburned fuel without modification of the traditional catalyst.

The gases from the reformer comprise a synthesis gas mixture of nitrogen, hydrogen, methane and traces of carbon monoxide and carbon dioxide. This synthesis gas mixture is typically fed through a solid gas filter after leaving the reformer. The synthesis gas mixture is then cooled in a heat exchanger to typical inlet shift reactor temperatures. In the shift reactor, carbon monoxide and water will react to produce carbon dioxide and hydrogen.

This entire synthesis gas mixture is then fed to a pressure swing adsorption unit which will separate the nitrogen and hydrogen from carbon dioxide and methane. The tail gas which is mainly carbon dioxide and methane from the pressure swing adsorption unit is fed to the regenerator and used as fuel in the regeneration process. The hydrogen and nitrogen can be compressed and cooled in a heat exchanger prior to being fed to the ammonia reactor. The result of the pressure swing adsorption process will be syngas with hydrogen to nitrogen ratio of 3 to 4 which is ideal for ammonia production. The hydrogen to nitrogen ratio might be controlled by adjusting the flue gas stream recycles to the reformer.

The ammonia reactor will produce both liquid ammonia and gaseous ammonia which can be recovered for use.

The inventive method will allow for a reduction in capital costs since no air separation unit will be required, particularly for small capacity operations. Further, improved plant efficiencies and lower carbon dioxide emissions per ton of ammonia produced can be achieved.

BRIEF DESCRIPTION OF THE DRAWINGS

The FIGURE is a schematic of the inventive process for producing synthesis gas for ammonia synthesis.

DETAILED DESCRIPTION OF THE INVENTION

The ammonia synthesis by chemical looping consists of four main steps. First a hydrocarbon treatment step followed by a reforming step. These steps are then followed by a synthesis gas treatment and tuning step and finally the ammonia synthesis loop.

The FIGURE describes a process flow for the invention. Natural gas is fed through line 100 and heat exchanger B to line 110 which enters a hydrodesulfurization unit A. The natural gas stream is both hydrogenated and desulfurized and is fed through line 111 to line 200 which contains steam. The resulting mixture of hydrogenated, desulfurized natural gas and steam is fed through line 130 to reforming reactor C. The reforming reactor C is a fluidized bed reactor loaded with two solid type materials. The first is a reforming solid catalyst, typically nickel based and non-transportable with a particle diameter size in the range of 5 to 15 mm (commercial catalyst from any catalyst manufacture). The other solid type material is a calcium oxide powder with an average particle size of 70 to 100 microns. The reforming reaction typically takes place at temperatures of 700° to 850° C., preferably 800° C.

The main reactions that take place in the fluidized bed are as follows:

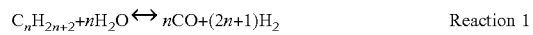  Reaction 1

  Reaction 2

  Reaction 3

The reaction products comprising calcium carbonate, calcium oxide and synthesis gas from the reforming reactor C leave the top of the reactor through line 140 where they are fed to a cyclone D where the gas is separated from the solids. The synthesis gas exits the cyclone D through line 150 and is fed to a solid gas filter E. The solids will be separated in the cyclone D and be fed through line 170 to a regenerator F. Any solids that are present in the synthesis gas fed to the solid gas filter E are separated and fed through line 180 to line 170 to join with the solids being fed to the regenerator F. Air is fed to the regenerator F through line 400 and a fuel such as natural gas, tail gas from pressure swing adsorption, or mixture of both is fed through line 300 to the regenerator F.

In the regenerator F, calcium carbonate is calcined to make CaO and therefore release carbon dioxide at a temperature range of 900° to 1000° C., preferably 950° C. In the regenerator F, the reverse of Reaction 3 above takes place. The exhaust gases from this process leave the regenerator F through line 201 to a second cyclone G where any remaining solids leave through the bottom of this cyclone G through line 190 to return to the reformer C. The gases which are rich in nitrogen leave the cyclone G through line 210 and a fraction is recycled via line 230. The remaining is purged through line 220 to the atmosphere.

The synthesis gas will exit the solid gas filter E through line 160 and be fed to a heat exchanger H. This synthesis gas is a mixture that contains mostly nitrogen, hydrogen and methane with traces of carbon monoxide. This gas stream is cooled by heat exchanger H down to a range of 180° to 300° C. depending upon whether a low or high temperature shift catalyst is employed, and is fed to the shift reactor I.

After the shift reaction the synthesis gas is fed through line 240 to heat exchanger J and fed to a knockout drum K where process condensate, which is mainly water and traces of CO₂, leaves unit operation K through line 270. The synthesis gas is fed through line 250 to a compressor L which feeds the compressed synthesis gas to a pressure swing adsorption unit M (Pressure 15 to 35 barg, temperature 25° to 50° C.) which will separate the trace carbon dioxide and the methane from the hydrogen and nitrogen present in the synthesis gas mixture. The carbon dioxide and methane are fed through line 280 to join with line 440 for feed as a fuel into the regenerator F.

The hydrogen and nitrogen are fed from the pressure swing adsorption unit M through line 290 to a compressor N where they are then fed through line 301 to a heat exchanger O before entering the ammonia reactor P (Pressure 150 to 250 barg and temperature 350° to 490° C.). The result of the pressure swing adsorption unit M operation will yield hydrogen and nitrogen in a ratio of 3 to 4 which is an appropriate ratio for the ammonia synthesis.

Gaseous ammonia is recovered through line 310 from the ammonia reactor P and is cooled through heat exchanger Q. The gas-liquid ammonia is fed to separation unit R and the liquid ammonia is recovered through line 320.

Gaseous ammonia is recovered from the ammonia separator vessel R, a small fraction of stream line 330 is purged to reduce inert build up and the remaining fraction is fed to line 340 that feeds the recycle compressor S. The outlet stream 350 of the recycle compressor S is mixed with the make up syngas stream 290 from the pressure swing adsorption unit M for feeding the compressor N and ultimately into ammonia reactor P.

The process layout described with respect to the FIGURE is simulated using 17,000 Ncum/h of natural gas (15.228 MMSCFD) as feed stock. The simulation results show that the energy consumption per ton of ammonia produced is around 33 GJ. This is almost half of the energy required using state of the art technology today to process such a volume of natural gas. Specific energy values from the literature are reported in Table 1 below,

TABLE 1

Specific Energy Requirements of Various Ammonia Processes

| Process | GJ (LHV)/t ammonia |
|---|---|
| State of the art (today's large ammonia plant) | 24-26* |
| Reformer pressure 5 to 10 bar | 47-53 |
| Reformer pressure 30 to 35 bar | 33-42 |
| Low-energy concepts | 27-33 |
| Classical Haber-Bosch (coke) | 80-90 |
| Inventive Process | 30-35 |

*Specific energy required for large plant capacities

While this invention has been described with respect to particular embodiments thereof, it is apparent that numerous other forms and modifications of the invention will be obvious to those skilled in the art. The appended claims in this invention generally should be construed to cover all such obvious forms and modifications which are within the true spirit and scope of the present invention.

Having thus described the invention, what we claim is:

1. A method for producing synthesis gas for the production of ammonia comprising the steps:
   a) Feeding a hydrocarbon and steam to a reformer;
   b) Feeding the reaction products of the reformer to a separation unit whereby solids are separated from gases;
   c) Feeding the solids to a regenerator and the gases to a shift reactor;
   d) Recycling a flue gas stream comprising carbon dioxide, steam, nitrogen, and CaO from the regenerator through a cyclone to the reformer;
   e) Feeding the products of the shift reactor to a pressure swing adsorption unit;
   f) Feeding hydrogen and nitrogen separated from the gases in step e) to an ammonia reactor; and
   g) Recovering ammonia from the ammonia reactor.

2. The method as claimed in claim 1 wherein the hydrocarbon is selected from the group consisting of methane, conventional and unconventional gases, Naphtha and liquid hydrocarbons.

3. The method as claimed in claim 1 wherein the reformer is a fluidized bed reactor.

4. The method as claimed in claim 3 wherein the fluidized bed reactor contains a solid nickel based catalyst and a calcium oxide powder.

5. The method as claimed in claim 1 wherein in step c) the solids are calcium carbonate and calcium oxide and the gases are a synthesis gas mixture.

6. The method as claimed in claim 1 wherein the shift reactor is selected from the group consisting of low temperature and high temperature shift.

7. The method as claimed in claim 1 wherein the regenerator produces CaO from calcium carbonate.

8. The method as claimed in claim 5 wherein the synthesis gas mixture comprises nitrogen, hydrogen, methane and carbon monoxide.

9. The method as claimed in claim 8 wherein the synthesis gas mixture is fed through a solid gas filter and a heat exchanger prior to being fed to the pressure swing adsorption unit.

10. The method as claimed in claim 9 wherein the pressure swing adsorption unit separates the synthesis gas mixture into a stream comprising carbon dioxide and methane and a stream comprising hydrogen and nitrogen.

11. The method as claimed in claim 10 wherein the stream comprising carbon dioxide and methane is fed to the regenerator and the stream comprising hydrogen and nitrogen is fed to the ammonia reactor.

12. The method as claimed in claim 11 wherein the stream comprising nitrogen and hydrogen is in a ratio of 3 to 4.

13. The method as claimed in claim 1 wherein ammonia is recovered as both liquid ammonia and gaseous ammonia.

14. A method for producing ammonia comprising the steps:
   a) Feeding a hydrocarbon and steam to a reformer;
   b) Feeding the reaction products of the reformer to a separation unit whereby solids are separated from gases;
   c) Feeding the solids to a regenerator and the gases to a shift reactor;
   d) Recycling a flue gas stream comprising carbon dioxide, steam, nitrogen, and CaO from the regenerator through a cyclone to the reformer;
   e) Feeding the products of the shift reactor to a pressure swing adsorption unit.

15. The method as claimed in claim 14 wherein the hydrocarbon is selected from the group consisting of methane, conventional and unconventional gases, naphtha and liquid hydrocarbons.

16. The method as claimed in claim 14 wherein the reformer is a fluidized bed reactor.

17. The method as claimed in claim 16 wherein the fluidized bed reactor contains a solid nickel based catalyst and a calcium oxide powder.

18. The method as claimed in claim 14 wherein in step c) the solids are calcium carbonate and calcium oxide and the gases are a synthesis gas mixture.

19. The method as claimed in claim 14 wherein the shift reactor is selected from the group consisting of low temperature and high temperature shift.

20. The method as claimed in claim 14 wherein the regenerator produces CaO from calcium carbonate.

21. The method as claimed in claim 18 wherein the synthesis gas mixture comprises nitrogen, hydrogen, methane and carbon monoxide.

22. The method as claimed in claim 21 wherein the synthesis gas mixture is fed through a solid gas filter and a heat exchanger prior to being fed to the pressure swing adsorption unit.

23. The method as claimed in claim 22 wherein the pressure swing adsorption unit separates the synthesis gas mixture into a stream comprising carbon dioxide and methane and a stream comprising hydrogen and nitrogen.

24. The method as claimed in claim 23 wherein the stream comprising carbon dioxide and methane is fed to the regenerator and the stream comprising hydrogen and nitrogen is fed to the ammonia reactor.

25. The method as claimed in claim 24 wherein the stream comprising nitrogen and hydrogen is in a ratio of 3 to 4.

26. The method as claimed in claim 14 wherein ammonia is recovered as both liquid ammonia and gaseous ammonia.

* * * * *